United States Patent [19]
Dammann et al.

[11] Patent Number: 5,781,283
[45] Date of Patent: Jul. 14, 1998

[54] PROCESS AND ARRANGEMENT FOR THE MEASUREMENT OF PHYSICAL VALUES OF LIGHT SCATTERING MOVING PARTICLES BY MEANS OF A LASER DOPPLER ANEMOMETER

[75] Inventors: Ehrhard Dammann; Juergen Bauer, both of Jena, Germany

[73] Assignee: Jenoptik AG, Jena, Germany

[21] Appl. No.: 644,334

[22] Filed: May 10, 1996

[30] Foreign Application Priority Data

Oct. 10, 1995 [DE] Germany ............... 195 37 647.1

[51] Int. Cl.$^6$ .................................................. G01P 3/36
[52] U.S. Cl. ...................................................... 356/28.5
[58] Field of Search ................................. 356/28.5, 345

[56] References Cited

U.S. PATENT DOCUMENTS

| | | | |
|---|---|---|---|
| 4,997,272 | 3/1991 | Dopheide et al. | 356/28.5 |
| 5,048,951 | 9/1991 | Combe et al. | 356/28.5 |

FOREIGN PATENT DOCUMENTS

| | | |
|---|---|---|
| 0636858A1 | 2/1995 | European Pat. Off. |
| 24 53 832 | 10/1975 | Germany . |
| 38 20 654 | 12/1989 | Germany . |
| 39 23 502 | 1/1991 | Germany . |
| 41 28 966 | 3/1993 | Germany . |
| 41 30 627 | 3/1993 | Germany . |
| 5002075 | 1/1975 | Japan . |

OTHER PUBLICATIONS

J.E. Schroder, "Dual Sinusodal Modulation Scheme For Directional Laser Doppler Velocimeter" pp. 114–116, Electronics Letters, Jan. 29, 1987, vol. 23 No. 3.

Boda Ruck, "Laser Doppler Anemometrie", pp. 362–375, Laser und Optoelektronik, Oct. 4, 1985.

D.A. Jackson et al., "Extrinsic fibre-optic sensors for remote measurement", pp. 243–307, Oct. 5, 1986, vol. 18 No. 5.

Durst F., et al., "Removal of Pedestrals and Directional Ambiguity of Optical Anemometer Signals", Applied Optics, Nov. 1974, vol. 13 No. 11.

Minimierung der Messunsicherheit von Laser-Doppler-Anemometern, Jërgern Czarske, et al., 1994, pp. 168–182.

Integrierte Optik, Wolfgang Karthe, et al., 1991, pp. 340–345.

*Primary Examiner*—Mark Hellner

[57] ABSTRACT

A process is provided for measuring physical values of light-scattering moving particles by means of laser Doppler anemometry and to a corresponding laser Doppler anemometer (LDA) with phase modulation. Generating a moving intensity-modulated superimposition signal in the measured volume of a LDA which is based on an uncomplicated driving of the phase modulator is achieved by having the phase modulator being driven by two sinusoidal driving signals with different frequencies ($\omega_1$, $\omega_2$) which are coupled so as to be fixed with respect to phase and frequency and wherein one frequency ($\omega_2$) is an integer multiple of the other frequency ($\omega_1$), and a filter frequency ($f_F$) which is a common multiple of the two frequencies ($\omega_1$, $\omega_2$) is filtered out from the output signal of the receiver by a bandpass filter. For this purpose, one of two sidebands occurring in the output signal of the receiver is suppressed by the appropriate amplitude adjustment of the driving signals at the phase modulator. The process and related arrangement are used for measuring velocity in flowing media and for measurements of length and acceleration of solid surfaces.

22 Claims, 3 Drawing Sheets

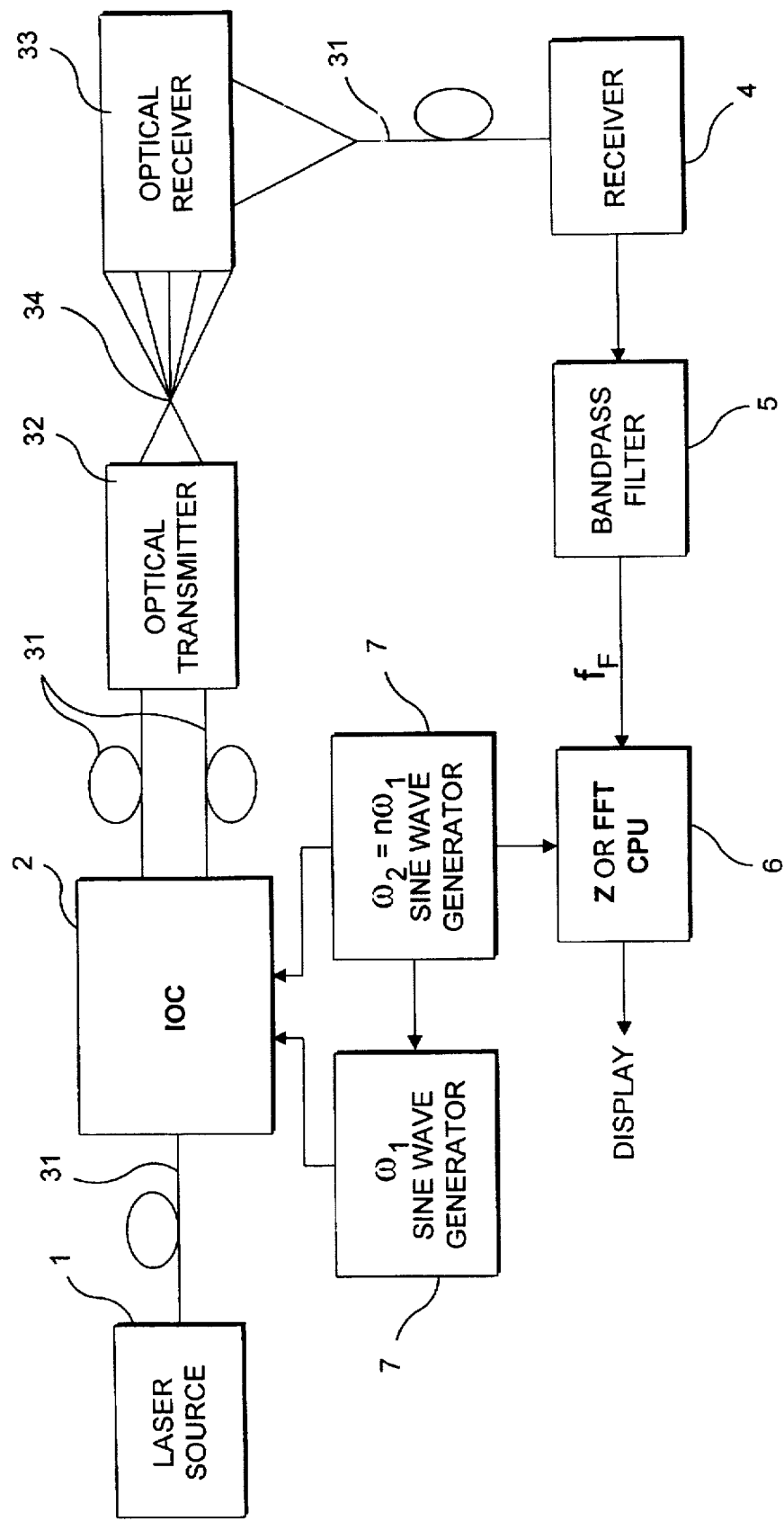
F I G. 1

PROCESS AND ARRANGEMENT FOR THE MEASUREMENT OF PHYSICAL VALUES OF LIGHT SCATTERING MOVING PARTICLES BY MEANS OF A LASER DOPPLER ANEMOMETER

BACKGROUND OF THE INVENTION a) Field of the Invention

The invention is directed to a process for measuring physical variables or values of light-scattering moving particles by means of laser Doppler anemometry and to a corresponding laser Doppler anemometer (LDA) with phase modulation. It is suited in particular for measuring the velocity of liquid and gaseous flowing media, but can also be used for measurements of length and acceleration of solid surfaces.

b) Description of the Related Art

LDA's are known measuring instruments which have multiple uses and which can also be used to determine the size and/or refractive index of scattering particles by known techniques of phase Doppler anemometry (PDA) with the use of different optical receivers and signal evaluating methods. In a LDA, the optical beam of a coherent light source is divided into two spatially separate partial beams which are imaged in a measurement point by optical collectors. In this case, an analyzable light-dark fringe pattern is formed on scattering particles of the moving medium. While the direct laser beams are guided in a light trap, a receiver which is arranged on the optical axis of the optical collector detects an interference fringe pattern when scattering objects are located at the measurement point. When a scattering particle crosses the interference fringe pattern, the receiver perceives an intensity modulation over a period of time in the scattered light and the velocity to be determined is calculated from the frequency of the intensity modulation by using the light wave length and the half angle between the partial beams.

In order to detect the direction of movement, it is conventional to produce a phase shift in a partial beam of the LDA. Recently, electro-optical phase modulators have been used increasingly for this purpose, since they can be installed together with the beam divider in a compact manner on integrated optical chips (IOC).

The phase shift is effected in a regular manner by using a sawtooth driving voltage, wherein the necessary phase shift of approximately 10 periods requires electrode lengths of roughly 20 mm and driving voltages of approximately 40 V. Although these values can still be realized with an integrated-optical phase modulator on APE:LiNbO$_3$, this solution has a further decisive drawback. In general, due to the final jumping back of the modulator voltage from the maximum value of the sawtooth to zero, no new evaluating signal in the same phase is produced by the renewed rise of the sawtooth driving voltage. A compulsory regulation of this jumping back and an additional "zero signal" for regulating the exact phase position of the new driving signal are always required for this purpose, bringing about an appreciable expenditure on electronics.

OBJECT AND SUMMARY OF THE INVENTION

Therefore, the primary object of the present invention is to find a possibility for generating a moving intensity-modulated superimposition signal in the measured volume of a LDA which is based on an uncomplicated driving of the phase modulator.

In a process for measuring physical values of light-scattering moving particles by means of a laser Doppler anemometer (LDA) in which the light from at least a pair of coherent partial beams is superimposed in a measurement point of a measured volume after at least one of the partial beams has traversed a phase modulator and in which, when scattering particles are present in the measured volume, at least components of the partial beams reach at least one receiver as scattered light and are converted into electrical output signals which are analyzed with respect to the magnitude of the Doppler shift, this object is met, according to the invention, in that the phase modulator is driven by two sinusoidal driving signals at different frequencies and amplitudes which are coupled so as to be fixed with respect to phase and frequency, wherein one frequency is an integer multiple of the other frequency, in that a filter frequency containing a common multiple of the two frequencies and having a bandwidth which detects the maximum anticipated Doppler shift is filtered out from the output signal of the receiver by a bandpass filter, and in that the driving signals are so adjusted with respect to the magnitude of amplitude that one of the two sidebands occurring in the signal which is filtered out is extensively suppressed and the other sideband is used for evaluating the Doppler shift.

The driving signals of the phase modulator are advantageously derived from one and the same sine wave generator.

The dividing of the beam for the purpose of generating coherent partial beams and the phase modulation are preferably carried out on an individual integrated-optical chip (IOC). In so doing, beam dividing for generating additional pairs of partial beams (for instance, for illuminating a plurality of measurement points) can be effected by means of optical branching means in multiplexing operation, wherein the output signals of the receiver associated with the different measurement points are switched over to the joint evaluating unit synchronously with respect to the driving. The output signal of the receiver or receivers is advisably transformed into a lower frequency range after being filtered by means of the electronic mixer.

The frequency difference between the selected, preferably lowest, common multiple of the modulation frequencies and the filtered out reception frequency is advantageously determined by a counter. The velocity of the particles can then be calculated from the counter value and the fringe spacing of the scattered light pattern on the receiver.

With respect to moving particles in a measured volume, it is advisable to generate forward and reverse pulses by linking the orthogonal system of the modulation frequencies with the filtered out reception frequency by means of a logic circuit in that the reception signal scans the orthogonal system and the movement direction is determined in an unambiguous manner from the current scanning value and the previous scanning value. The path traveled by the scattering particles can be determined from the forward and reverse pulses generated in this way by means of allocating the fringe spacing in that the difference in the forward and reverse pulse count is multiplied by the mean fringe spacing.

Further, the filtered out reception signal can advisably be processed in that the spectral distribution of the reception signal is determined from a determined quantity of scanning points by means of a special signal processor after analog-to-digital conversion, wherein a difference frequency of the datum line or base line of this spectral distribution and the lowest common multiple of the modulation frequencies corresponds to the Doppler frequency.

In a laser Doppler anemometer which contains at least two coherent partial beams, a phase modulator in at least one of the partial beams, optical means for beam guiding, for focussing two partial beams on moving particles in a measured volume, and for imaging at least a component of the partial beams as light scattered by the moving particles, and a receiver for receiving the scattered light formed of a pair of partial beams, the above-mentioned object is met based on the described process in that two sinusoidal driving signals with different modulation frequencies and amplitudes which are coupled so as to be fixed with respect to phase and frequency are present at the phase modulator, wherein one of the modulation frequencies is an integer multiple of the second modulation frequency, in that a bandpass filter is arranged downstream of the receiver, the filter frequency of the bandpass filter containing a common multiple of the modulation frequencies with a bandwidth by which the maximum anticipated Doppler frequency shift can be detected, and in that the amplitudes of the driving signals at the phase modulator are so adjusted that one of the sidebands occurring as a result of the Doppler shift is extensively suppressed in the output signal of the receiver and only the other sideband serves as the basis for evaluation in an evaluating unit using the frequency and phase information of the driving signals of the phase modulator.

The phase modulator is advisably connected with one and the same sine wave generator via two different signal paths for driving with the two modulation frequencies, wherein a frequency divider is contained in at least one of the signal paths.

The evaluating unit has different components depending on the measurement task. For the purpose of determining the velocity of scattering particles, it preferably contains a counter which counts the change in signals resulting from the passing interference fringes.

If additional forward and reverse pulses are required, the evaluating unit advantageously contains a PLL circuit which emits appropriate pulses.

Alternatively, a special digital signal processor can be contained in an advantageous manner. After an analog-to-digital conversion of the reception signal of a determined quantity of scanning points, this signal processor determines the spectral distribution of this reception signal via a fast Fourier transform and gives the difference frequency of the base line of this spectral distribution with respect to the lowest common multiple of the modulation frequencies as a Doppler frequency. For this purpose, the time base of the digital signal processor is in a fixed ratio to the modulation frequencies of the phase modulator.

In order to achieve a complete construction for the LDA, the dividing of the beam of light of the laser source and the phase modulation are both advantageously realized on a common IOC in the form of Y-branching means and an electro-optical phase modulator. In order to realize a plurality of measurement points in the measured volume, the light of a laser diode is advantageously divided into at least two pairs of partial beams, wherein one partial beam in each pair of partial beams associated with a measurement point has a phase modulator. In order to generate equal partial beam pairs for additional measurement points, an additional frequency-controlled beam divider is advisably integrated on the IOC and a multiplexer which operates synchronously with the beam dividing frequency is provided between the respective receivers associated with the measurement points and the bandpass filter in the evaluating unit. The parallel arrangement of phase modulators on the IOC has the advantage that adjacent phase modulators share a common electrode.

The invention is based on the idea that in order to reduce the output density of the laser radiation in LDA's with electro-optical phase modulators it must be possible to evaluate superimposition signals for determining the Doppler frequency in a manner similar to heterodyne interferometry. For this purpose, according to the invention, the phase modulator is driven with two frequencies which are coupled so as to be fixed with respect to frequency and phase and a range of the expected value of the Doppler frequency is filtered out by means of a bandpass filter around the lowest common multiple of the modulation frequencies of the phase modulator. Accordingly, in practice, a frequency range $<f=m\ f_0\pm\Delta v$ is filtered out from a frequency spectrum $E(f_0, 2f_0, 3f_0, \ldots nf_0, [n+1]\ f_0, \ldots)$ of the receiver signal, where m is the lowest common multiple of the two modulation frequencies exciting the phase modulator. By means of a phase shift between the modulation frequencies, their amplitudes are so adjusted that one of the occurring sidebands $E_m^-$ ($m\ f_0-\Delta v$) or $E_m^+$ ($m\ f_0-\Delta v$) is very extensively suppressed. The Doppler frequency $\Delta v$, from which the velocity of the moving particles can be determined, is given by comparing the rest of the sideband with the lowest common multiple of the modulation frequencies.

As a result of the process, according to the invention, for measuring physical values of light-scattering moving particles by means of a suitably designed LDA, it is possible to generate a moving intensity-modulated superimposition signal in the measured volume of the LDA making use of the fundamental principles of heterodyne interferometry and in which an uncomplicated twofold sine-wave driving of the phase modulator is used. Accordingly, it is possible to use low laser outputs (less than 1 mW) as well as low driving voltages of the phase modulator. This results in the additional advantage that the beam-dividing and phase-modulating component parts of the LDA can be realized on a compact integrated-optical chip (IOC).

The invention will be explained more fully in the following with reference to embodiment examples.

BRIEF DESCRIPTION OF THE DRAWINGS

Shown in the drawings are:

FIG. 1 illustrates the basic construction of a LDA according to the invention;

DETAILED DESCRIPTION OF CERTAIN PREFERRED EMBODIMENTS

Figure 2:
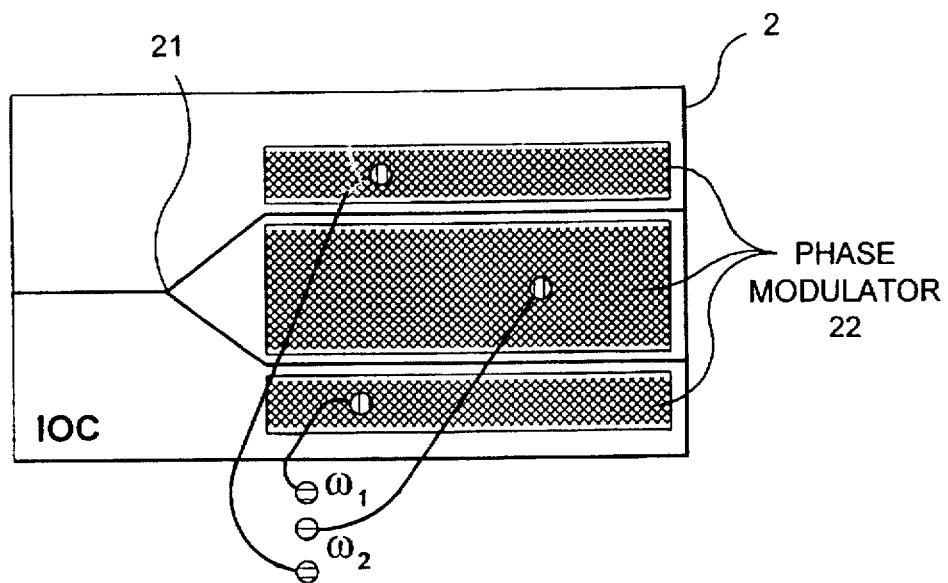
FIG. 2 illustrates an embodiment example of an IOC for realizing an electro-optical phase modulator with two-frequency driving.

The process, according to the invention, for the measurement of physical values of light-scattering particles operates on the principle of two-beam Doppler anemometry. Substantial novel steps consist in the use of a two-frequency phase modulation with a coupling of the two frequencies which is fixed with respect to phase and frequency and with the condition that one frequency is an integer multiple of the other frequency and, further, a bandpass filtering of the receiver signal on the frequency of the lowest common multiple of the modulation frequencies $\omega_1$ and $\omega_2$ in the bandwidth of the expected maximum Doppler shifts and a suppression of one of the two occurring sidebands of the Doppler shift for evaluating the second sideband. The invention will be explained more exactly by showing the design and by describing the operation of the advantageous constructions of the LDA shown in the drawings.

FIG. 1 shows a basic variant of an LDA according to the invention. The light of a laser source 1, which is preferably a laser diode for the sake of the desired compactness, although the use of any laser is optional in principle, is directed via a light-conducting fiber 31 to an integrated-optical chip (IOC) 2. The IOC 2 contains Y-branching means 21 as well as a phase modulator 22 (FIG. 2). As is shown in FIG. 2, the design and driving of the phase modulator 22 represents an advantageous arrangement of an electro-optical phase modulator 22 in the two-beam Doppler method of a LDA. Due to the very high switching frequency of the electro-optical effect in an IOC 2 which is preferably formed of $LiNbO_3$ and the low driving voltage for the phase modulator 22, the modulation frequencies $\omega_1$ and $\omega_2$ can be very high. However, they are advisably selected in dependence on the maximum velocity of the scattering particles in the measurement point 34. According to the invention, the phase modulator 22 is driven with two modulation frequencies $\omega_1$ and $\omega_2$ which are coupled so as to be fixed with respect to phase and frequency and which are harmonics of one and the same fundamental frequency $f_0$. For this purpose, one modulation frequency $\omega_2$ is advisably an integer multiple of the other modulation frequency $\omega_1$. A fundamental frequency $f_0$ and its first harmonic $2f_0$ are advantageously used.

According to FIG. 1, the laser light which is modulated in this way is guided in turn via light-conducting fibers 31 of an optical transmitter 32, as conventionally used, which focusses the two partial beams on a common measurement point 34 and superimposes them. Scattering particles located in the measurement point 34 reproduce a continuous fringe pattern which is coupled into a light-conducting fiber 31 by means of an optical receiver 33 and is directed onto a receiver 4, preferably an avalanche photodiode. A bandpass filter 5 which follows the receiver 4 and which filters out a bandwidth of the maximum fluctuation width of the Doppler shift at the frequency of the lowest common multiple of the modulation frequencies $\omega_1$ and $\omega_2$ transmits a receiver signal having the following structure to the evaluating unit 6:

$$E(t) = B\sin(\Delta \nu)t\sin nf_0 t + C\cos(\Delta \nu)t\cos nf_0 t$$
$$= \frac{C+B}{2} \cos[nf_0 t - (\Delta \nu)t] + \frac{C-B}{2} \cos[nf_0 t + (\Delta \nu)t],$$

where $\omega_1 = f_0$ and $\omega_2 = nf_0$ are used as modulation frequencies $\omega_1$ and $\omega_2$.

When n=2 and the filter frequency $f_F = 2f_0$ is filtered out, this reception signal has two sidebands $E_2^+(t)$ and $E_2^-(t)$ with frequencies $f_0 = 2f_0 + \Delta \nu$ and $f_0 = 2f_0 - \Delta \nu$, where $\Delta \nu$ represents the Doppler shift.

When the parameters B=C are specially selected, the sideband $E_2^+$ is completely suppressed so that a single-sideband detection of the Doppler signal can be carried out in a manner known per se.

The suppression of one of the sidebands can be achieved by adjusting the phase shift at the phase modulator 22.

For the purpose of adjusting the appropriate working point (which should be designated by D formulaically), the amplitudes of the driving signals can be so adjusted individually that they cause the desired phase shift. The phase shift which is brought about is proportional to the driving voltage of the phase modulator. A phase shift of 180° is caused, for example, by an amplitude of $\pi$.

In order to adjust the respective working point $D_2$ when n=2 (to achieve B=C), where $D_2=0.66$, the amplitudes of the driving signals $A_2=3.80$ and $A_{22}=1.35$ are used so that the filtered receiver signal $E_2(t) = 2D_2 \cos [2f_0 t - (\Delta \nu)t]$ is evaluated.

The filtering can be carried out at all frequencies $nf_0$. Accordingly, the working point $D_1=0.68$ at $A_{11}=1.83$ and $A_{12}=1.38$ is given for the component $E_1(t)$ with frequency $f_0$.

However, a more precise method consists in a one-time adjustment of the working point in situ, where the amplitude of the sidebands is observed by means of a spectral analyzer and a sideband is suppressed by shifting the working point by means of the selection of the phase shift at the phase modulator 22.

The evaluation of the filtered receiver signal is effected in a manner known per se in the evaluating unit 6, the various types of evaluation offering particular advantages for the LDA according to the invention.

The mathematically signed frequency difference between the lowest common multiple of the modulation frequencies $\omega_1$ and $\omega_2$ (for $\omega_1=f_0$ and $\omega_2=2f_0$ in the simplest case) and the filtered out reception frequency ($f_F=2f_0$) corresponds in every case to the Doppler frequency and is directly proportional to the velocity of the scattering particles.

In the simplest case, the frequency difference is detected by means of counters, as is symbolized by Z in the evaluating unit 6. For this purpose, a gate time which is formed from the recorded filter frequency $f_F$ by mixing and dividing is measured with the highest possible counting frequency. The simple mathematical linking of the counting value and the fringe spacing gives the measurement for the velocity. The counting frequency of the counter and the lowest common multiple of the modulation frequency are advisably in an integer ratio. This situation is symbolized in FIG. 1 by the connecting line to a first sine wave generator 7 which has priority in the coupling of the modulation frequencies $\omega_1$ and $\omega_2$ which is fixed with respect to frequency and phase. The generation of the dependent modulation frequency $\omega_1$ is likewise symbolized by a connecting line to another sine wave generator 7 which is advantageously used according to FIG. 1.

A second evaluating method of the LDA uses an orthogonal system of modulation frequencies $\omega_1$ and $\omega_2$ (sine and cosine) and links it with the filtered out reception frequency $f_F$. Th orthogonal system of modulation frequencies $\omega_1$ and $\omega_2$ is converted into one of two digital signals with a phase shift of 90°, this orthogonal system being scanned by the reception signal. A movement and the direction of this movement can be determined in an unequivocal manner from the current scanning value and the previous value by means of a PLL (phase-locked loop). A suitable logic circuit converts this content into forward or reverse pulses, such a pulse being emitted per interference fringe spacing. The path traveled by the moving particles is given directly from the difference of the emitted forward or reverse pulse count multiplied by the fringe spacing.

In this evaluating variant the advantage of a phase modulator 22 which is constructed in $LiNbO_3$ becomes particularly apparent, since only as a result of the high switching frequency of the phase modulator 22 is it possible to use a PLL when the amount of the relative Doppler shift with respect to the filtered out reception frequency $f_F$ (which advisably corresponds to the greater of the two modulation frequencies $\omega_1$ and $\omega_2$ is less than 2.

A third evaluating method which is symbolized in an abbreviated manner in FIG. 1 by FFT (Fast Fourier Transform) uses the filtered out reception signal after a fast analog-to-digital conversion as a numbers column for calculating a spectral distribution of the reception signal based on a FFT. A special signal processor calculates the spectral distribution from a determined number of scanning points. The frequency difference between the base line of this distribution and the modulation frequency $\omega_2$ again corresponds to the Doppler shift, from which the movement data of the scattering particles can be determined.

Figure 3:
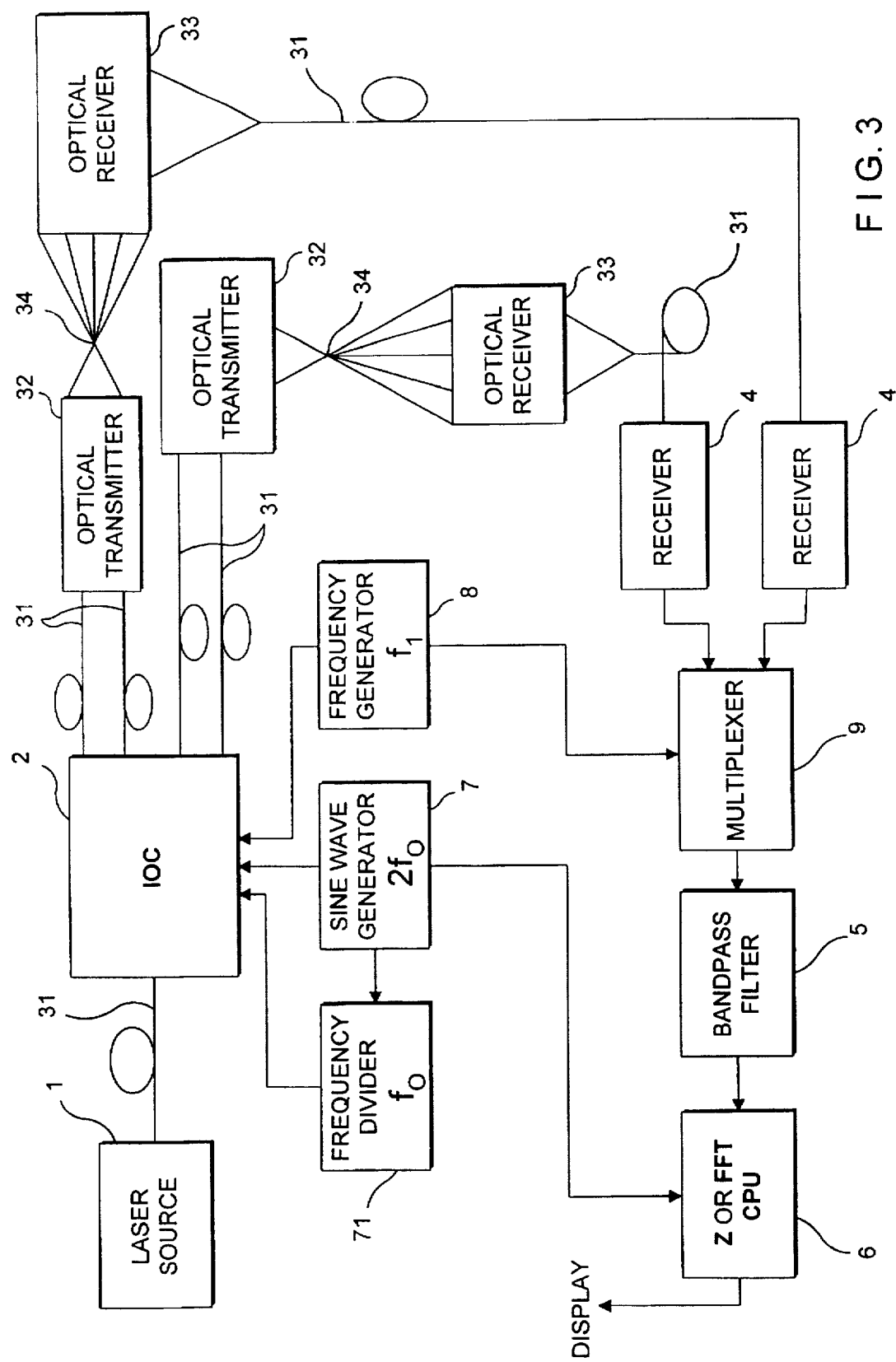
FIG. 3 illustrates an advantageous constructional variant of the LDA according to the invention for two measurement points.

FIG. 3 shows an embodiment form of the invention which is constructed in a particularly simple and advantageous manner and which is appropriate when a plurality of measurement points 34 must be detected in the measured volume.

Figure 4:
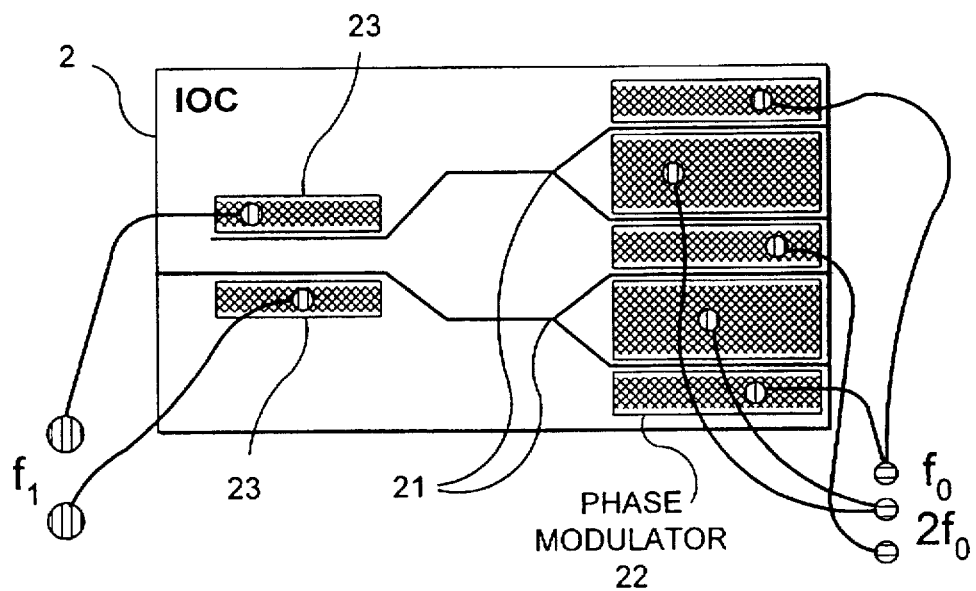
FIG. 4 illustrates the construction of an IOC adapted to FIG. 3.

The light from laser source 1 is guided to an IOC 2 by means of a light-conducting fiber 31 as in Example 1. This IOC 2 is designed specifically for the use of two measurement points 34 without automatically doubling the subsequent expenditure. FIG. 4 shows an advantageous construction of the IOC 2. The phase modulators 22, which preferably contain shared electrodes, work with the same driving signals and the arriving laser light is alternatively switched to the respective phase modulator 22 by frequency-controlled branching means 23. An additional beam dividing frequency $f_1$ which is supplied by a frequency generator 8 is used for this purpose. Further, this frequency generator 8 controls a multiplexer 9 which alternately feeds the signals of the receiver 4 (two receivers in this case) to the shared bandpass filter 5. Accordingly, the expenditure on elements need only be doubled separately for generating and recording the interference fringe pattern in the measurement points 34. Following the frequency-controlled branching means 23, the IOC 2 has Y-branching means 21 in each light channel so that two pairs of partial beams which are capable of interfering are provided at the output side of the IOC 2. The phase modulators 22 are accordingly amalgamated with one another to the extent that there is only one electrode in each instance between the four divided light channels, which electrode serves two adjacent light channels, so that the electrode connections are arranged in a mirror-symmetrical manner with respect to the dividing line between the pairs of partial beams. In the present case, the IOC 2 is constructed symmetrically with respect to the center line as is shown in FIG. 4.

In this example, concrete sinusoidal signals with modulation frequencies $\omega_1 = f_0$ and $\omega_2 = 2f_0$ are used as driving signals. For this purpose—as is shown in FIG. 3—a sine wave generator 7 having the fundamental frequency $2f_0$ and a subsequent frequency divider 71 which halves the frequency of the sine wave generator 7 are provided. Further, the sine wave generator 7 with the fundamental frequency $2f_0$ supplies the comparison frequency and clock frequency for the evaluating unit 8.

Evaluation is advantageously effected according to the second variant from Example 1 in that the frequency divider 71 contains a 90-degree phase shift so that the orthogonal system of the modulation frequencies $\omega_1$ and $\omega_2$ is formed automatically and can be evaluated in an advantageous manner. All other operations of the LDA according to the invention are carried out in the same way as in Example 1.

While the foregoing description and drawings represent the preferred embodiments of the present invention, it will be obvious to those skilled in the art that various changes and modifications may be made therein without departing from the true spirit and scope of the present invention.

What is claimed is:

1. A process for the measurement of physical values of light-scattering moving particles by means of a laser Doppler anemometer in which the light from at least a pair of coherent partial beams is superimposed in a measurement point of a measured volume after at least one of the partial beams has traversed a phase modulator and in which, when scattering particles are present in the measured volume, at least components of the partial beams reach at least one receiver as scattered light and are converted into electrical output signals which are analyzed with respect to the magnitude of the Doppler shift, comprising the steps of:

driving the phase modulator by two sinusoidal driving signals with different frequencies ($\omega_1$, $\omega_2$) and amplitudes which are coupled so as to be fixed with respect to phase and frequency, wherein one frequency ($\omega_2$) is an integer multiple of the other frequency ($\omega_1$);

filtering a filter frequency ($f_F$) containing a common multiple of the two frequencies ($\omega_1$, $\omega_2$) and having a bandwidth which detects the maximum anticipated Doppler shift from the output signal of the receiver by a bandpass filter; and adjusting the driving signals with respect to the magnitude of their amplitude so that one of the two sidebands occurring in the signal which is filtered out is extensively suppressed and the other sideband is used for evaluating the Doppler shift.

2. The process according to claim 1, wherein the two driving signals of the phase modulator are derived from one and the same sine wave generator.

3. The process according to claim 1, wherein the driving signals of the phase modulator which are coupled so as to be fixed with respect to phase have a defined phase shift for detecting the movement direction.

4. The process according to claim 1, wherein a dividing of the beam for the purpose of generating coherent partial beams and the phase modulation are realized by means of an integrated-optical chip.

5. The process according to claim 4, wherein, by frequency-controlled optical branching means in multiplexing operation, a plurality of measurement points are optically controlled sequentially and the output signals of the receiver from different measurement points are switched to the shared bandpass filter synchronously with respect to the driving of the frequency-controlled branching means.

6. The process according to claim 1, wherein the output signal of the receiver is transformed into a lower frequency range after being filtered by an electronic mixer.

7. The process according to claim 1, wherein the frequency difference between the selected, in particular, the lowest common multiple of the modulation frequencies ($\omega_1$, $\omega_2$) and the filtered out reception frequency is determined by a counter, and the velocity is calculated from the counter value and the fringe spacing of the scattered light pattern on the receiver.

8. The process according to claim 1, wherein forward or reverse pulses are generated in the presence of moving particles in the measured volume by linking the orthogonal sine-cosine system of the modulation frequencies ($\omega_1$, $\omega_2$) with the filtered out reception frequency by a logic circuit, wherein the reception signal scans the orthogonal system and the movement direction is determined in an unambiguous manner from the current scanning value and the previous scanning value.

9. The process according to claim 8, wherein a fringe spacing is allocated in each instance in the presence of a forward pulse or reverse pulse and the path traveled by the scattering particles is determined from the forward and reverse pulses multiplied by the fringe spacing.

10. The process according to claim 1, wherein the filtered out reception signal is processed in a special signal processor after analog-to-digital conversion, said special signal processor determining the spectral distribution from a determined number of scanning points, wherein the difference frequency of the base line of this spectral distribution relative to the lowest common multiple of the modulation frequencies ($\omega_1$, $\omega_2$) corresponds to the Doppler frequency.

11. The process according to claim 10, wherein the time base of the signal process is in a fixed ratio to the modulation frequencies ($\omega_1$, $\omega_2$).

12. In a laser Doppler anemometer which contains at least two coherent partial beams, a phase modulator in at least one of the partial beams, optical means for beam guiding, for focussing two partial beams on moving particles in a measured volume, and for imaging at least a component of the partial beams as light scattered by the moving particles, and a receiver for receiving the scattered light formed from a pair of partial beams, the improvement comprising:

- means for providing two sinusoidal driving signals with different modulation frequencies ($\omega_1$, $\omega_2$) and amplitudes which are coupled so as to be fixed with respect to phase and frequency at said phase modulator, wherein one of the modulation frequencies ($\omega_1$) is an integer multiple of the second modulation frequency ($\omega_2$);
- a bandpass filter being arranged downstream of the receiver, the filter frequency ($f_F$) of the bandpass filter containing a common multiple of the modulation frequencies ($\omega_1$, $\omega_2$) with a bandwidth by which the maximum anticipated Doppler frequency shift can be detected; and
- means for adjusting the amplitudes of the driving signals at the phase modulator so that one of the sidebands occurring as a result of the Doppler shift is extensively suppressed in the output signal of the receiver and only the other sideband serves as the basis for evaluation in an evaluating unit using the frequency and phase information of the driving signals of the phase modulator.

13. The arrangement according to claim 12, wherein said phase modulator is connected with one and the same sine wave generator via two different signal paths for driving with the different modulation frequencies ($\omega_1$, $\omega_2$), wherein at least one signal path contains a frequency divider.

14. The arrangement according to claim 13, wherein a phase shifter is arranged in a signal path.

15. The arrangement according to claim 14, wherein the evaluating unit contains a phase-locked loop circuit which emits forward or reverse pulses.

16. The arrangement according to claim 12, wherein there is a counter in the evaluating unit and wherein the count of the interference fringes, in connection with the spacing, gives the velocity.

17. The arrangement according to claim 12, wherein the evaluating unit contains a special digital signal processor which is based on a fast Fourier transform and evaluates the spectral distribution of the reception signal, wherein the difference frequency of the base line of the spectral distribution with respect to the lowest common multiple of the modulation frequencies ($\omega_1$, $\omega_2$) corresponds to the Doppler frequency.

18. The arrangement according to claim 12, wherein Y-branching means for splitting the partial beams from a laser source and an electro-optical phase modulator for phase modulation are arranged on an integrated-optical chip.

19. The arrangement according to claim 18, wherein the light of a laser source is divided into at least two pairs of partial beams in order to realize a plurality of measurement points and wherein one partial beam in each pair of partial beams associated with a measurement point has a phase modulator.

20. The arrangement according to claim 18, wherein the IOC has an additional frequency-controlled branching means for generating equal partial beams for additional measurement points, and wherein a multiplexer which is operated synchronously with the additional beam dividing frequency ($f_1$) is arranged between the respective receivers and the bandpass filter.

21. The arrangement according to claim 19, wherein two phase modulators share a common electrode in each instance.

22. The arrangement according to claim 20, wherein two phase modulators share a common electrode in each instance.

* * * * *